(12) United States Patent
Montagne

(10) Patent No.: US 12,523,921 B2
(45) Date of Patent: Jan. 13, 2026

(54) NON-ROTATING ELLIPTICAL IRIS DIAPHRAGM

(71) Applicant: THALES, Meudon (FR)

(72) Inventor: Laurent Montagne, Villeurbanne (FR)

(73) Assignee: THALES, Meudon (FR)

( * ) Notice: Subject to any disclaimer, the term of this patent is extended or adjusted under 35 U.S.C. 154(b) by 174 days.

(21) Appl. No.: 18/693,937

(22) PCT Filed: Sep. 15, 2022

(86) PCT No.: PCT/EP2022/075613
§ 371 (c)(1),
(2) Date: Mar. 20, 2024

(87) PCT Pub. No.: WO2023/046563
PCT Pub. Date: Mar. 30, 2023

(65) Prior Publication Data
US 2024/0393661 A1   Nov. 28, 2024

(30) Foreign Application Priority Data

Sep. 21, 2021   (FR) ...................................... 2109913

(51) Int. Cl.
*G03B 9/06*   (2021.01)

(52) U.S. Cl.
CPC ...................... *G03B 9/06* (2013.01)

(58) Field of Classification Search
CPC .................................. G03B 9/06; G02B 5/005
See application file for complete search history.

(56) References Cited

U.S. PATENT DOCUMENTS

| 1,302,359 A | 4/1919 | Garbutt |
| 4,047,807 A | 9/1977 | Okano |
| (Continued) | | |

FOREIGN PATENT DOCUMENTS

| DE | 20 2015 009206 U1 | 11/2016 |
| FR | 1 463 015 A | 6/1966 |

*Primary Examiner* — Leon W Rhodes, Jr.
(74) *Attorney, Agent, or Firm* — BakerHostetler

(57) ABSTRACT

An iris diaphragm having an optical axis, includes a fixed ring, a mobile ring designed to rotate about the optical axis with respect to the fixed ring and comprising a plurality n of guidance guideways, a plurality of n blades defining an elliptical diaphragm aperture having a major axis (a) and a minor axis (b), each blade being able to pivot with respect to the fixed ring about a respective axis and comprising a respective mobile pin able to move in one of the respective guidance guideways by bearing along the respective guidance guideway, a control ring designed to rotate about the optical axis with respect to the fixed ring and comprising a control guideway wherein one of the mobile pins, referred to as control pin, is able to move by bearing along the control guideway, a shape of each guidance guideway on which the respective mobile pin bears being designed so that a rotation of the control ring about the optical axis gives rise, via the control pin, to a rotation of the mobile ring and a movement of the mobile pins in the guidance guideways so as to modify an area of the elliptical aperture without modifying an orientation of the major axis and of the minor axis and without modifying a ratio of the major axis to the minor axis.

6 Claims, 18 Drawing Sheets

(56) References Cited

U.S. PATENT DOCUMENTS

| | | | |
|---|---|---|---|
| 7,918,617 B2* | 4/2011 | Kawamoto | G03B 9/06 |
| | | | 396/510 |
| 9,134,588 B2* | 9/2015 | Shibasaki | G03B 9/06 |
| 10,634,828 B2* | 4/2020 | Okada | G02B 7/102 |
| 11,073,742 B2* | 7/2021 | Sato | G03B 9/06 |

* cited by examiner

NON-ROTATING ELLIPTICAL IRIS DIAPHRAGM

CROSS-REFERENCE TO RELATED APPLICATIONS

This application is a National Stage of International patent application PCT/EP2022/075613, filed on Sep. 15, 2022, which claims priority to foreign French patent application No. FR 2109913, filed on Sep. 21, 2021, the disclosures of which are incorporated by reference in their entireties.

FIELD OF THE INVENTION

The present invention relates to the field of iris diaphragms.

BACKGROUND

The objectives of photographic equipment and cinematographic cameras are generally equipped with circular diaphragms arranged transversely with respect to the optical axis of the lenses. Circularity over all apertures is desirable in order to make best use of the quality of the objectives which are made up of spherical lenses with the least possible aberration in the recorded image.

In order to create these diaphragms it is possible to use a simple hole in a wall interposed in the path of the light or several holes placed on a mobile element that enable succinct adjustment of the different aperture diameters.

Other optical systems that require greater compactness or a very large number of different aperture sizes employ an iris diaphragm, which allows continuous adjustment between its maximum aperture and its minimum aperture.

An iris diaphragm comprises a set of blades the edge of which describes segments of curves, the blades together defining an aperture in the shape of a regular polygon.

FIG. 1 shows an iris diaphragm PA of the prior art with an aperture O in a configuration A with a larger aperture than configuration B. The iris diaphragm PA comprises a plurality of blades L typically made of metal or of plastic. In order to allow adjustment of the aperture size, each blade is for example connected to a ring R by a pivot connection the axis of which is perpendicular to the plane of the diaphragm or is translationally mobile with respect to the ring R. The controlled movement of the blades allows the aperture O to be decreased or increased. The aperture of the iris diaphragm is typically controlled by a peg T placed on the edge face of the ring of the diaphragm.

The number and shape of the blades that make up the iris is variable. The shape of this aperture will dictate the shape of out-of-focus background regions or bokeh. Thus, large-aperture objectives having a diaphragm made up of numerous (8 or 9) and rounded blades permit bokeh effects of near-circular appearance and a sharper transition with the sharply focused zone. The higher the number of blades, the more closely the shape of the regions will conform to that of a perfect disk. Conversely, certain objectives produce pentagonal or hexagonal bokeh effects, depending on the number of blades that make up the diaphragm of the objective. The shape of the bokeh region may also be oval, depending on the optical design of the objective, and notably where use is being made of an anamorphic objective (for example in the case of cinematographic objectives).

Controlling the shape and orientation of the bokeh effects is important in certain applications (photography and cinema). In diaphragms of the prior art, the shapes rotate according to the aperture size of the diaphragm. This effect is undesirable.

SUMMARY OF THE INVENTION

The invention aims to overcome certain problems of the prior art. Therefore, a subject of the invention is an iris diaphragm having a structure suitable for defining an elliptical aperture that produces a bokeh effect of which the shape and the orientation do not change according to the diaphragm aperture size.

To this end, one subject of the invention is an iris diaphragm having an optical axis and comprising:
 a fixed ring,
 a mobile ring designed to rotate about the optical axis with respect to the fixed ring and comprising a plurality n of guidance guideways,
 a plurality of n blades defining an elliptical diaphragm aperture having a major axis a and a minor axis b, each blade being able to pivot with respect to the fixed ring about a respective axis and comprising a respective mobile pin able to move in one of the respective guidance guideways by bearing along the respective guidance guideway,
 a control ring designed to rotate about the optical axis with respect to the fixed ring and comprising a control guideway in which one of the mobile pins, referred to as control pin, is able to move by bearing along the control guideway,
 a shape of each guidance guideway on which the respective mobile pin bears being designed so that a rotation of said control ring about the optical axis gives rise, via the control pin, to a rotation of said mobile ring and a movement of the mobile pins in the guidance guideways so as to modify an area of the elliptical aperture without modifying an orientation of the major axis and of the minor axis and without modifying a ratio of the major axis to the minor axis.

According to one preferred embodiment of the invention, the fixed ring and the control ring are configured to cause the mobile ring to rotate about the optical axis in a predetermined angular sector.

According to one preferred embodiment of the invention, the plurality of blades is arranged between the fixed ring and the mobile ring. As a preference, the mobile ring is arranged between the control ring and the fixed ring.

According to one preferred embodiment of the invention, the blades are of different shapes.

According to one preferred embodiment of the invention, the rings are configured to define a maximum dimension of the major axis of said elliptical aperture.

BRIEF DESCRIPTION OF THE FIGURES

Other features, details and advantages of the invention will become apparent on reading the description given with reference to the appended drawings, which are given by way of example and in which, respectively.

In the figures, unless otherwise indicated, the elements have been drawn to scale.

DETAILED DESCRIPTION

Figure 1:
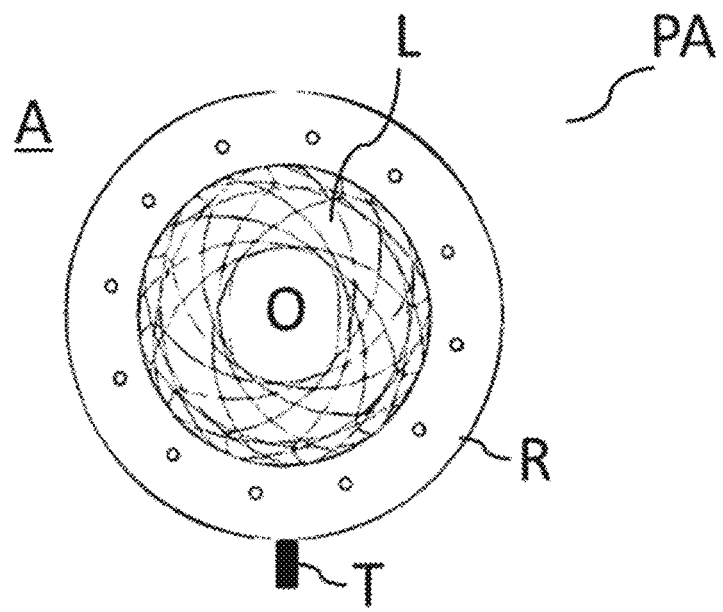
FIG. 1 is a schematic view of an iris diaphragm of the prior art.
Figure 1:
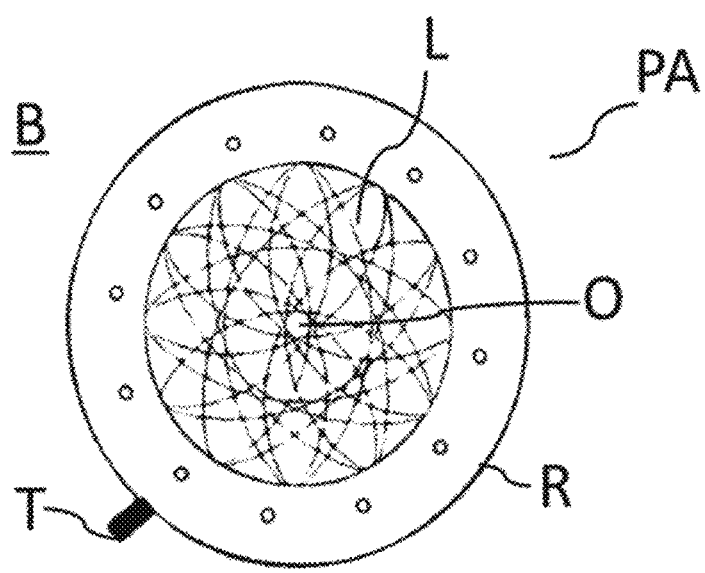
Figure 2:
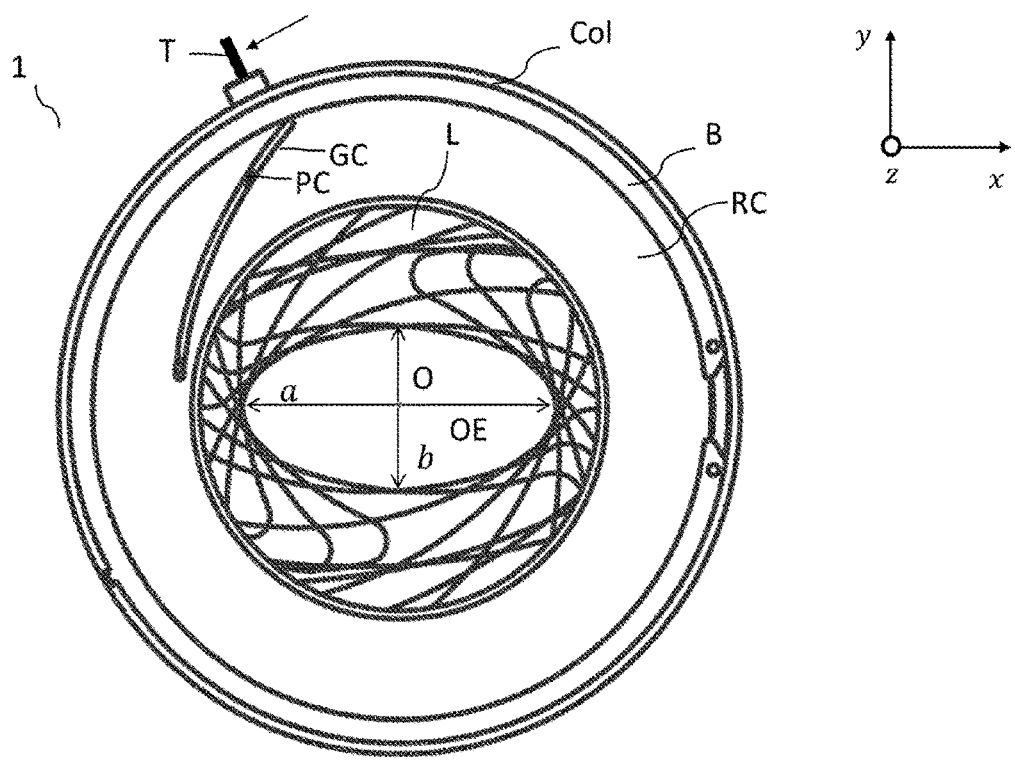
FIG. 2 is an iris diaphragm according to the invention.

FIG. 2 schematically illustrates an iris diaphragm 1 according to the invention, particularly suited to camera objectives or photography objectives. The configuration illustrated in this figure, referred to as embodiment M1 hereinafter, is provided by way of nonlimiting example and may be modified according to variants obvious to a person skilled in the art without departing from the scope of the invention.

Figure 3A:
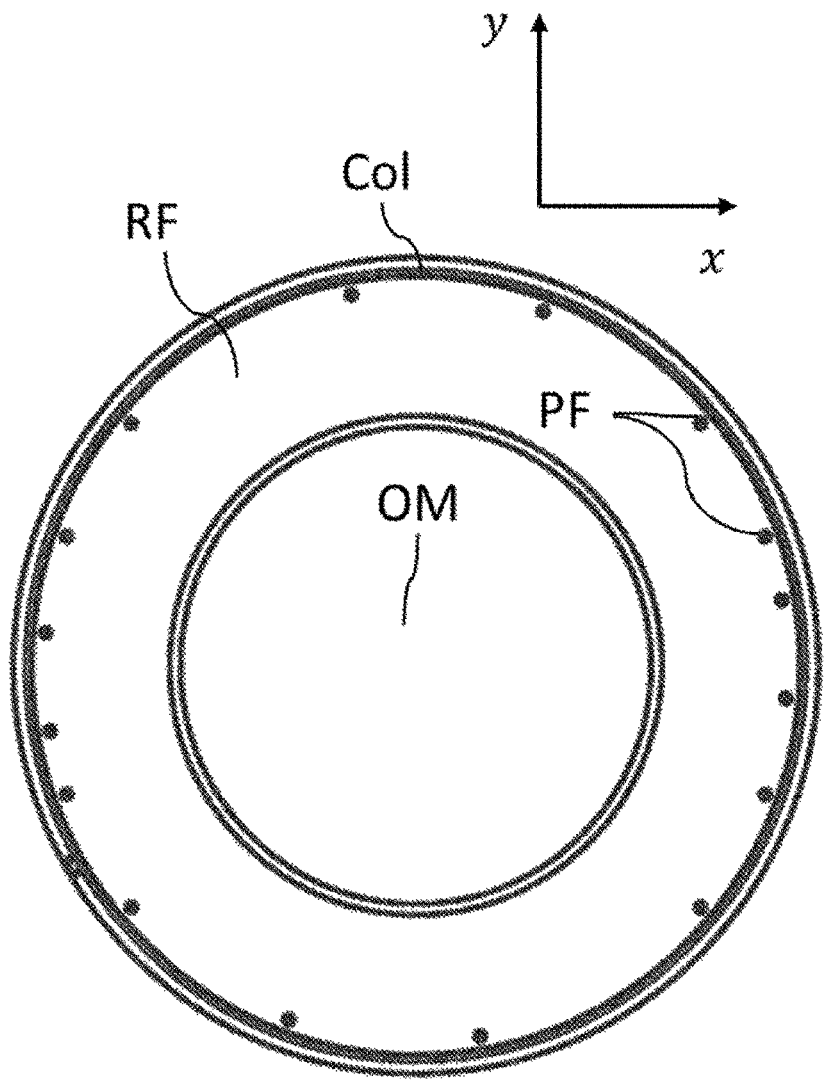
FIG. 3A, FIG. 3B, FIG. 3C are, respectively, a face-on view, a profile view and a perspective view of the fixed ring of the embodiment M1 of the invention.
Figure 3B:
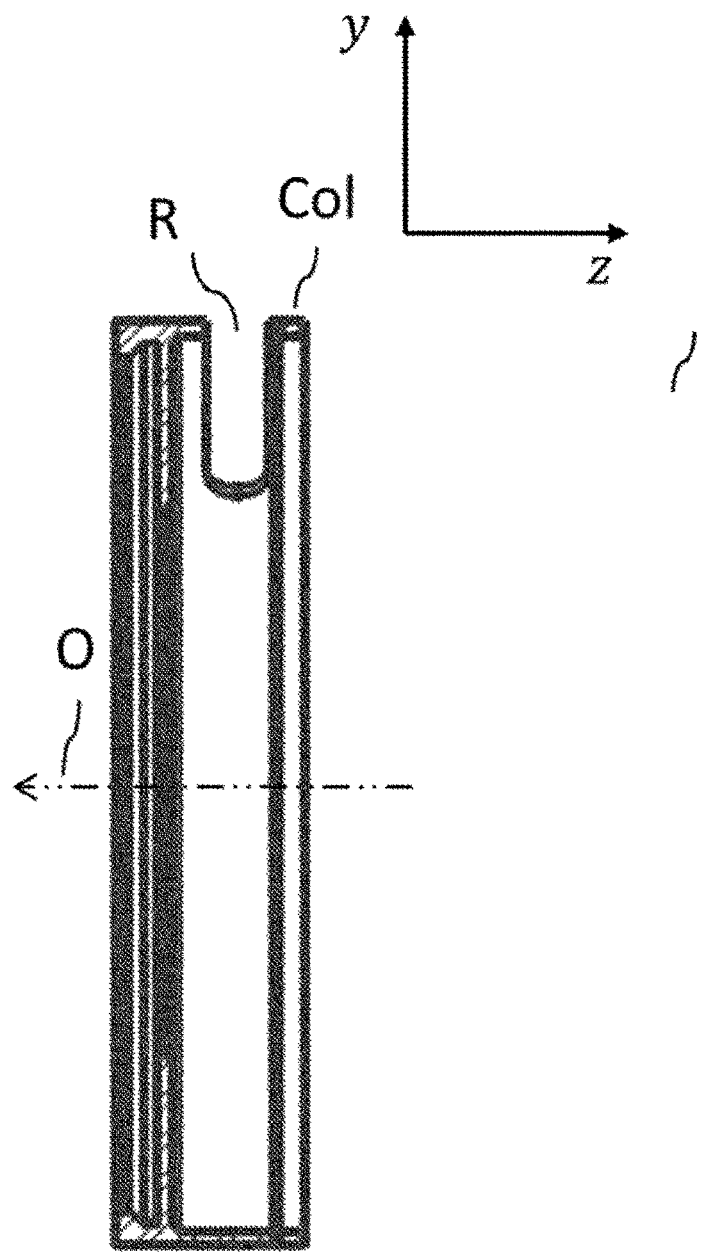
Figure 3C:
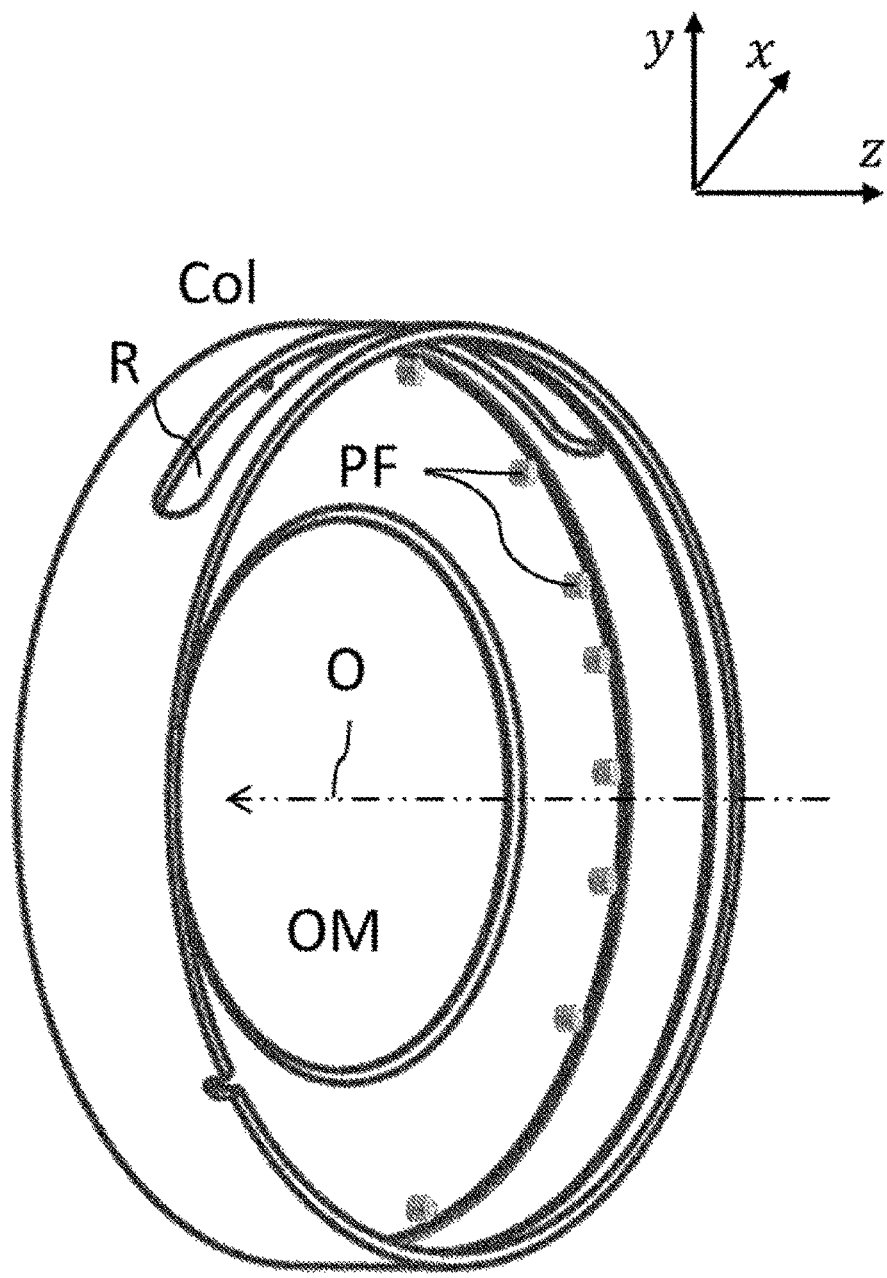

The diaphragm 1 comprises a fixed ring RF (not visible in FIG. 2 but shown in FIGS. 3A-3C). This fixed ring RF constitutes the only element of the diaphragm to remain immobile with respect to the optical axis O of the diaphragm. This is the element with respect to which the other parts of the diaphragm 1 will move. In the illustration of FIG. 2, by way of example, the optical axis O is perpendicular to the plane xy of the diaphragm and is in the direction z.

The diaphragm comprises a mobile ring RM designed to rotate about the optical axis O with respect to the fixed ring RF. The mobile ring RM is not shown in FIG. 2 but is visible in FIGS. 6A-6C and 7C. As will be explained later on, the mobile ring RM is the element of the diaphragm that ensures that the aperture maintains its shape as the diaphragm 1 is decreased or increased in size. For that purpose, the mobile ring comprises a plurality n of guidance guideways GG (see FIGS. 6A-6C and 7C).

The diaphragm comprises a plurality of n blades L the edge of which describes segments of curves, the blades together defining an aperture in the shape of a regular polygon. In the invention, the blades define an elliptical diaphragm aperture OE. The elliptical aperture has a major axis a and a minor axis b. What is meant here by an "elliptical aperture" is that the shape of the regular polygon defined by the blades is near-elliptical. With due consideration to the elliptical shape of the aperture OE, the bokeh effect obtained using the diaphragm of the invention will itself also be elliptical in shape. In order to be able to modify the aperture size, in the diaphragm of the invention, each blade is able to pivot with respect to the fixed ring about a respective axis. Thus, the rotation of each blade L with respect to the fixed ring RF about a respective axis is achieved by means of a respective pivot connection connecting the fixed ring RF to the blade L. In addition, each blade L comprises a respective mobile pin PM able to move in a respective one of the guidance guideways GG by bearing along the respective guidance guideway GG (not visible in FIG. 2 but visible in FIGS. 6A and 6B). What is meant by "comprising a pin" is that the mobile pin PM is attached to the respective blade L or, in other words, that the mobile pin PM is set into the respective blade L.

Finally, the diaphragm 1 comprises a control ring RC designed to rotate about the optical axis with respect to the fixed ring RF. The control ring RC is the element of the diaphragm that allows the mobile ring RM to rotate and therefore allows the mobile pins PM to move. For that purpose, the control ring RC comprises a control guideway GC in which one of the mobile pins PM, referred to as control pin PC, is able to move by bearing along the control guideway GC. This control pin PC is therefore a longer mobile pin PM which passes through a guidance guideway GG of the mobile ring RM and bears along the control guideway GC of the control ring RC. It is therefore able to move along the two guideways GG and GC. Thus, rotation of the control ring RC brings about that of the mobile ring RM via the control pin PC and therefore brings about the movement of the mobile pins PM in the guidance guideways GG. The layout and movement of the various elements of the diaphragm can be seen in FIGS. 3A to 7C.

Unlike in the iris diaphragm of the prior art, the elliptical aperture OE of the diaphragm 1 of the invention produces a bokeh effect of which the type of shape and the orientation do not change according to the diaphragm aperture size. That means that the shape and the orientation of the elliptical aperture OE remains identical irrespective of the aperture size of the diaphragm. For that reason, the shape of each guidance guideway GG on which the respective mobile pin PM bears is designed so that rotation of the control ring RC about the optical axis gives rise, via the control pin PC, to a rotation of said mobile ring RM and a movement of the mobile pins PM in the guidance guideways GG so as to modify an area of the elliptical aperture OE without modifying an orientation of the major axis a and of the minor axis b and without modifying a ratio a/b of the major axis to the minor axis.

It must be understood that the invention is not restricted to the guidance guideway shapes illustrated in the figures (FIGS. 6A-6C for example), but covers all shapes of guidance guideway so long as they allow the desired effect, namely that of maintaining the shape and orientation of the elliptical aperture, to be obtained. In light of the description of the invention and of FIGS. 2 to 8, a person skilled in the art will know how to adapt the shape of the guidance guideways and that of the blades without an unreasonable amount of trial and error. The key point of the invention is that the use of the guidance guideways comprised in the mobile ring for guiding the movement of the mobile pins of the blades and therefore the rotation of the blades, coupled with a control ring for causing the mobile ring to move, allows the aperture shape and orientation to be maintained.

According to one preferred embodiment of the invention, the fixed ring RC and the control ring RC are configured to cause the mobile ring to rotate about the optical axis in a predetermined angular sector. By way of nonlimiting example, in the diaphragm of the embodiment M1 of FIG. 2, the fixed ring RF comprises a collar Col exhibiting a slot R. In addition, the diaphragm comprises a peg T secured to the control ring and able to move in the slot by bearing along the slot. The length of the travel of the peg T in the slot R fixes the amplitude of possible angular rotation of the control ring RC and of the ring RM and therefore limits the maximum and minimum aperture size that the elliptical aperture OE can achieve. FIG. 2 illustrates the fact that the action by the user on the peg T, indicated by an arrow in FIG. 2, allows the control ring to be rotated and the control pin moved in the control guideway. Alternatively, according to another embodiment, rotation is achieved by a rotary knob, for example offset on the collar.

The diaphragm of FIG. 2 further comprises a retaining ring B secured to the collar and designed to keep the various rings RF, RM and RC close to one another without restricting the rotation of the rings RC and RM with respect to the ring RF. More specifically, the retaining ring B prevents translational movement of the rings RC and RM along the optical axis O with respect to the fixed ring RF. The retaining ring B is produced for example in the form of an internal circlip fitted into a groove in the collar Col.

In the embodiment M1 of FIG. 2, by way of nonlimiting example, the major axis a of the elliptical aperture OE is horizontal (in the direction x). Alternatively, according to another embodiment, by way of nonlimiting example, the major axis a of the elliptical aperture OE is in a direction different than the direction x (for example in the direction y).

The rings RM, RC and RC are made from a material that is diffusing with respect to visible light, for example anodized aluminum colored black and then coated with a matt black lubricant treatment that reduces unwanted light.

FIGS. 3A to 7C are depictions of the various elements of the diaphragm of the embodiment M1 illustrated in FIG. 2. As explained previously, the depictions are given by way of nonlimiting example and the embodiment M1 illustrated in these figures may be modified according to variants that are obvious to a person skilled in the art, without departing from the scope of the invention. Notably, in the embodiment of FIGS. 2 to 7C, sixteen blades each having a respective guidance guideway have been depicted. Alternatively, according to another embodiment, a number of blades and of guidance guideways different than 16 is used in the diaphragm. The higher the number of blades and guideways, the more closely the shape of the bokeh regions will conform to a perfect ellipse for all aperture sizes of the diaphragm 1. Furthermore, the use of a high number of guideways makes it easier to maintain an orientation of the major axis and of the minor axis without modifying a ratio of the major axis to the minor axis. For that reason, it is preferable to have at least 10 blades and guidance guideways in the diaphragm of the invention.

FIGS. 3A to 3C are, respectively, a face-on view, a profile view and a perspective view of the fixed ring RF of the embodiment M1. In this embodiment M1, the fixed ring RF has a collar Col with a slot R to limit the rotation of the control ring about the optical axis in a predetermined angular sector by means of the peg T attached to the control ring. As explained previously, the rotation of each blade with respect to the fixed ring about a respective axis is achieved by means of a respective pivot connection connecting the fixed ring to the blade. In the diaphragm of the embodiment M1, by way of nonlimiting example, the pivot connections are achieved by a plurality n of fixed pins PF comprised in the fixed ring, each blade being able to pivot about a respective fixed pin. Alternatively, in another embodiment, the fixed pins are comprised in the blades rather than in the fixed ring. The ring RF comprises a central aperture OM inside which the elliptical aperture defined by the blades L is inscribed.

Figure 4A:
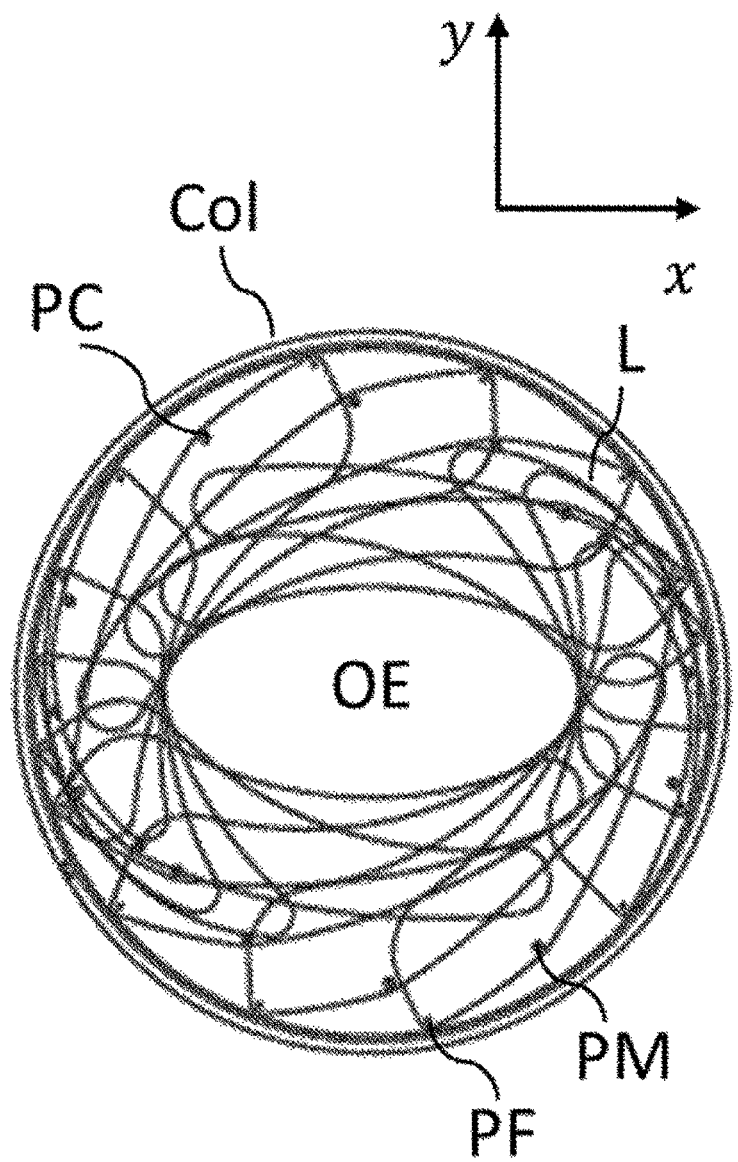
FIG. 4A, FIG. 4B, FIG. 4C are face-on views of the fixed ring and of the blades of the embodiment M1 for different diaphragm aperture sizes.
Figure 4B:
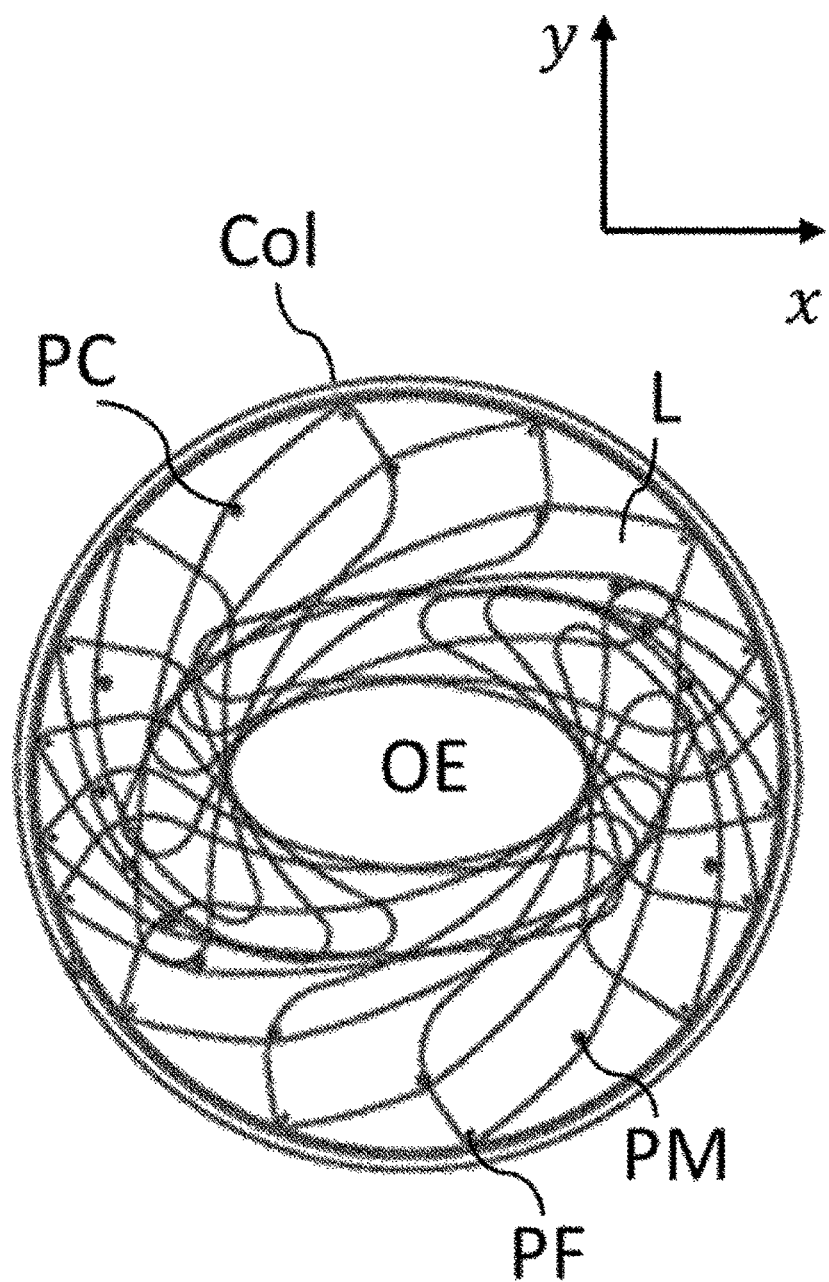
Figure 4C:
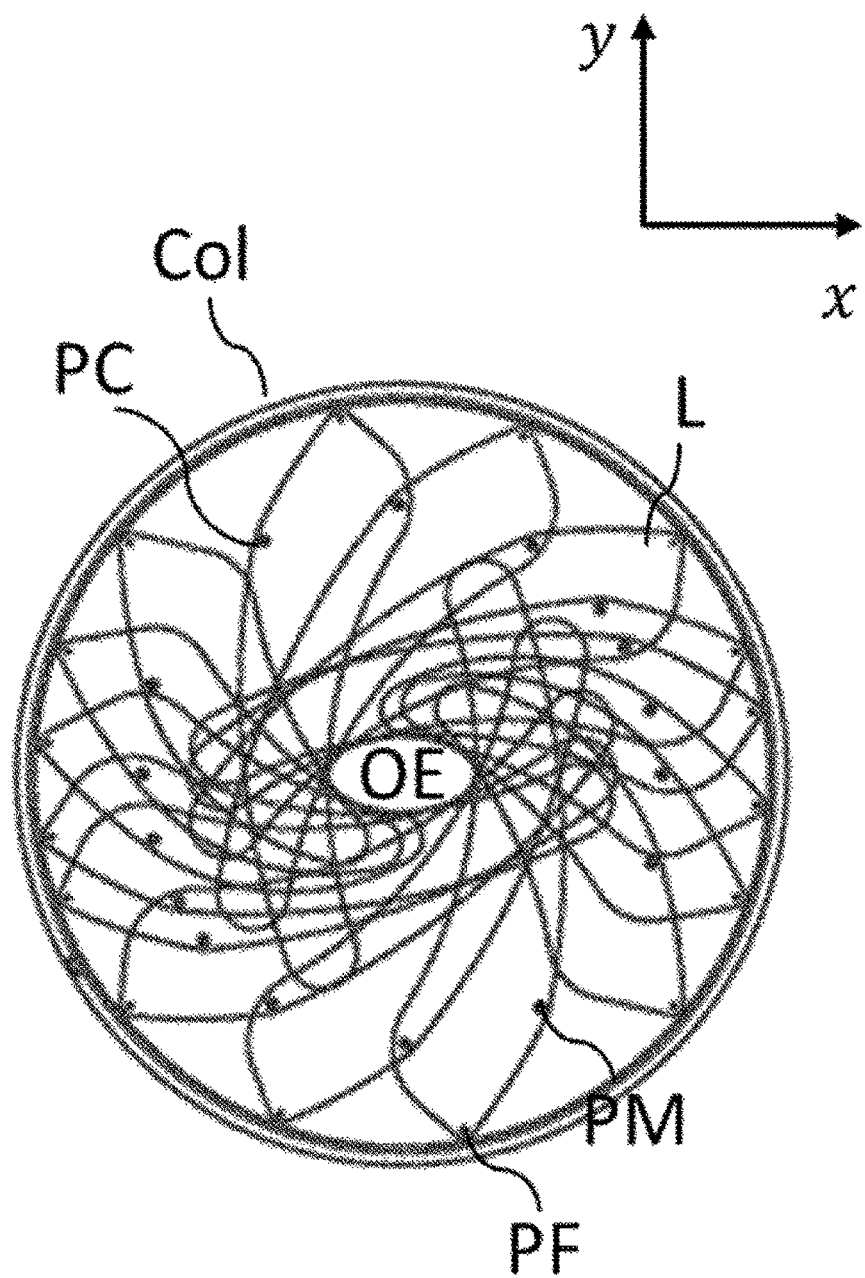
Figure 4D:
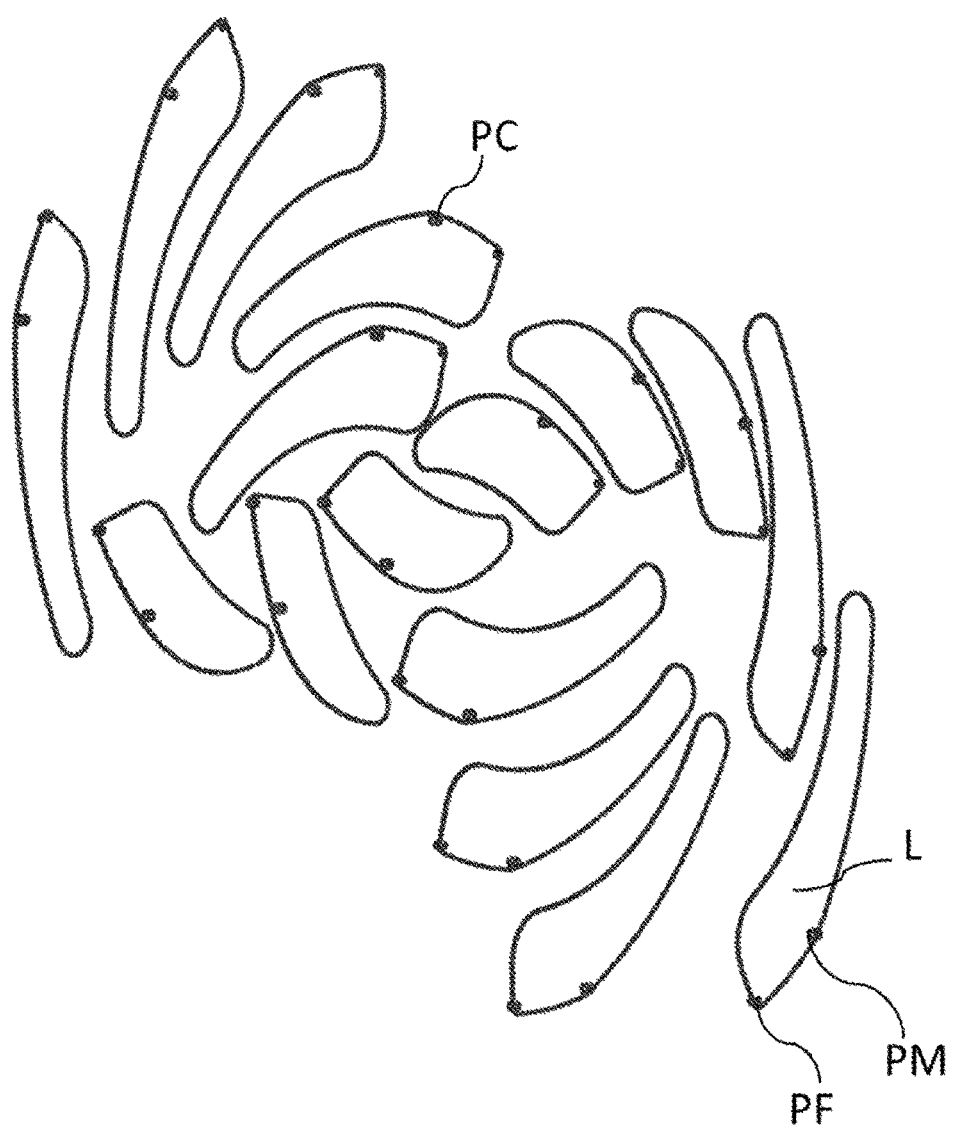
FIG. 4D shows the blades of the embodiment M1 for different diaphragm aperture sizes.
Figure 5A:
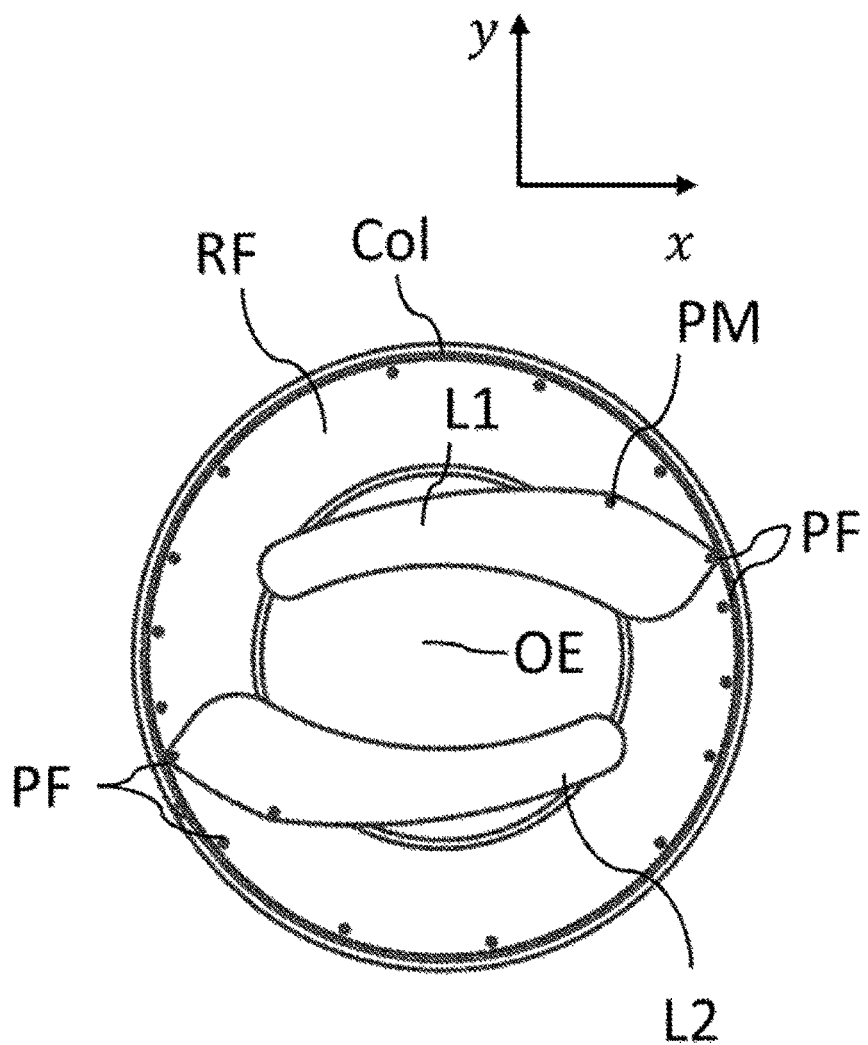
FIG. 5A, FIG. 5B, FIG. 5C are face-on views of the fixed ring RC and of just two, L1 and L2, of the 16 blades, from the largest to the smallest aperture size, respectively.
Figure 5B:
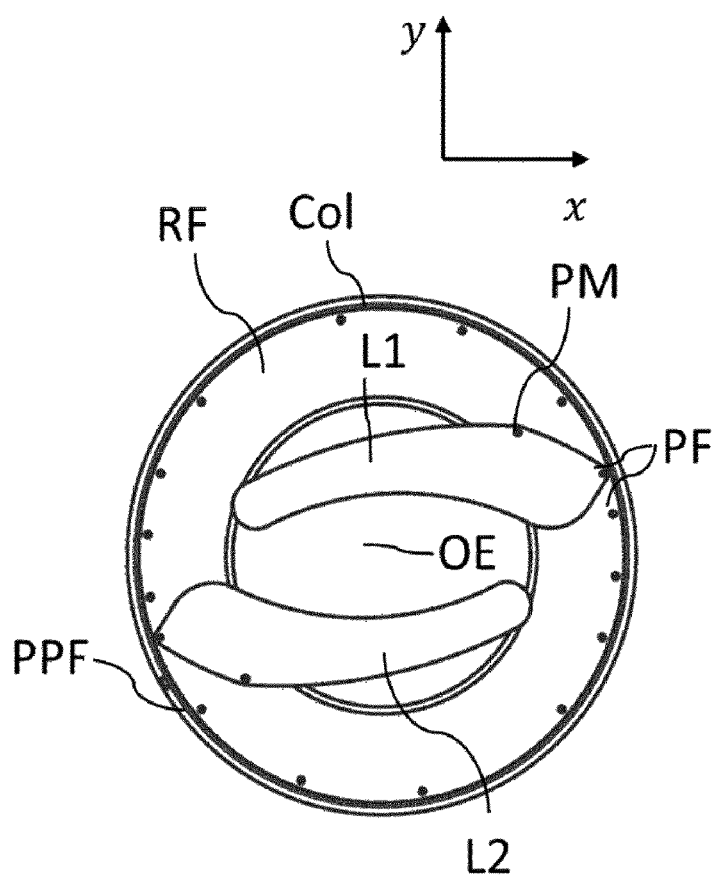
Figure 5C:
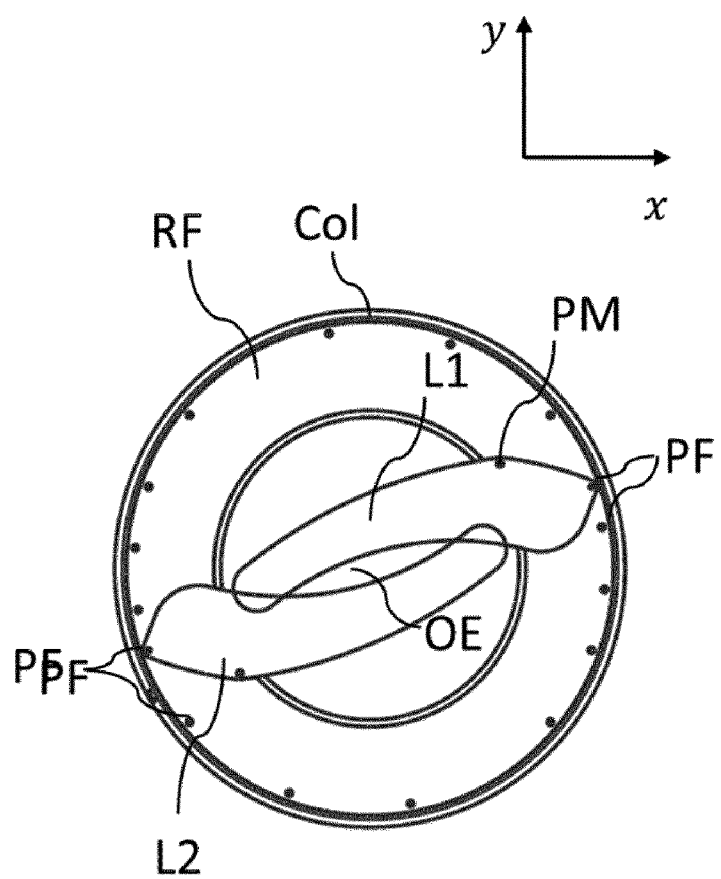

FIGS. 4A to 4C illustrate a face-on view of the fixed ring RF and of the blades L of the embodiment M1 for different diaphragm aperture sizes (ranging from the largest aperture size in the case of FIG. 4A to the smallest aperture size in the case of 4C). In order to provide a clearer overview of the movement of the blades as a function of the diaphragm aperture size, FIGS. 5A to 5C illustrate a face-on view of the fixed ring RC and of just two, L1 and L2, of the 16 blades, for different diaphragm aperture sizes (ranging from the largest aperture size in the case of FIG. 5A to the smallest aperture size in the case of 5C). As a preference, the blades L are arranged in such a way as to extend substantially in a plane perpendicular to the optical axis (and therefore parallel to the plane xy of the fixed ring RF). In practice, the blades L overlap and slide over one another. Each blade L extends in the plane xy. The blade thickness is very small compared to the blade dimensions in the plane xy. The elliptical aperture OE may be considered also to extend in the plane xy. The blades L, the mobile pins PM, the fixed pins PF and the control pin PC of the embodiment M1 are visible in FIG. 4D. From FIG. 4D, it may be seen that the blades do not all have the same shape so the blades can define an aperture the shape of which is elliptical over the entire range of possible diaphragm aperture sizes. More specifically, in the embodiment M1, the blades are pairwise symmetrical by rotation about the optical axis.

These FIGS. 4A to 5C show the way in which the blades pivot about the axis formed by each of the fixed pins PF according to aperture size, this pivoting being based on the movement of the mobile pins along the guidance guideways GG (which are not depicted in FIGS. 4A-5C).

The control pin PC, which corresponds to a mobile pin that is longer than the other mobile pins, is shown in FIGS. 4A-4C. As explained previously, it is the movement of the control ring RC that will give rise to the movement of the pin PC in the control guideway GC.

In the embodiment M1, partially illustrated in FIGS. 4A to 5C, the blades are stacked facing the fixed ring within the diaphragm. This arrangement allows the respective pivot connections of the blades (via the fixed pins PF between the fixed ring and the blades) to be of shorter height and therefore more robust.

Figure 6A:
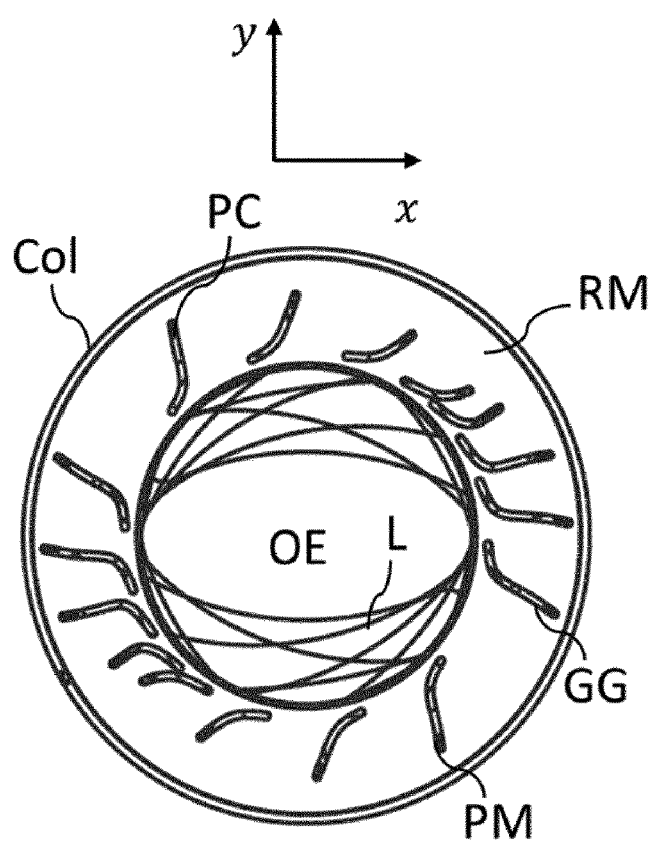
FIG. 6A, FIG. 6B, FIG. 6C are, respectively, face-on and exploded views of a diaphragm stack of the embodiment M1 for different aperture sizes.
Figure 6B:
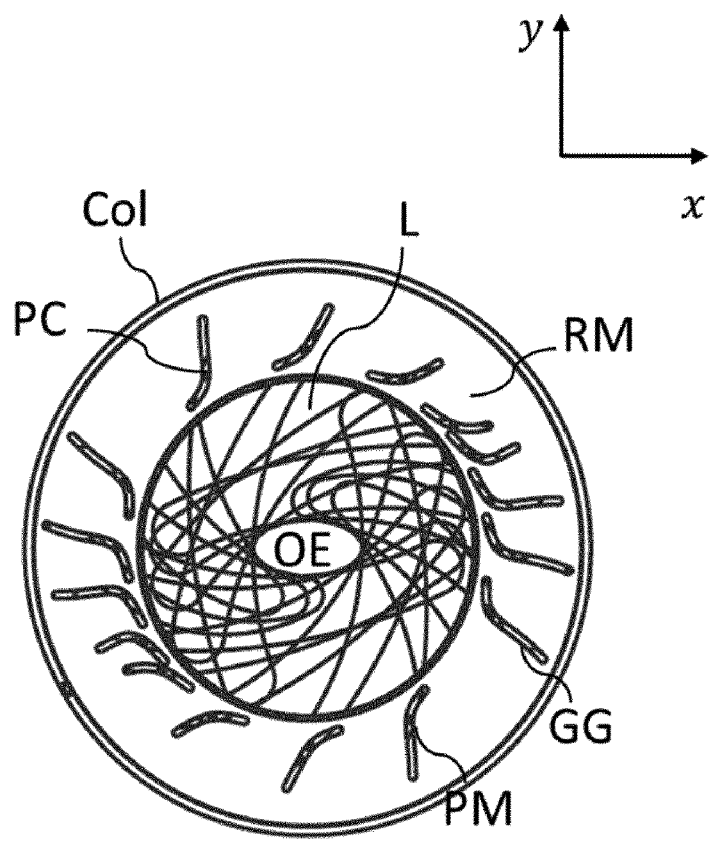
Figure 6C:
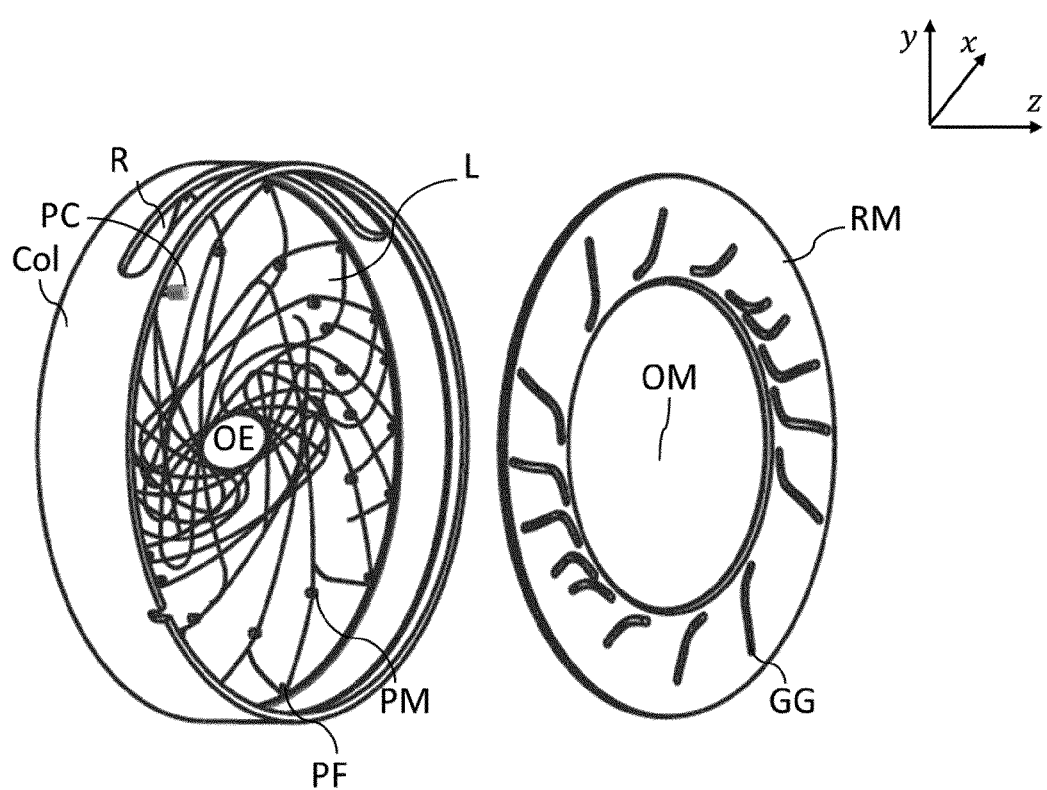

FIGS. 6A and 6B illustrate a face-on view of a diaphragm stack of the embodiment M1, which stack is formed of the fixed ring RF, then the blades L, and then the mobile ring RM, for two diaphragm aperture sizes (a larger aperture size in the case of FIG. 6A and the smallest aperture size in the case of 6B). FIG. 6C depicts an exploded perspective view of this stack. As these figures show, the movement of each blade with respect to the fixed ring does not have the same impact on the change in shape and orientation of the elliptical aperture. For example, because of their position, the movement of certain blades will have a greater modifying effect on the major axis a than the movement of other blades. This is why, in the invention in the embodiment M1 and in the invention more generally, the shape of each guidance guideway is adapted according to the position and the shape of the blade associated with the guidance guideway.

In the diaphragm stack of the embodiment M1 which has been partially illustrated in FIGS. 6A to 6C, the mobile ring is arranged between the control ring and the fixed ring and the blades are arranged between the mobile ring and the fixed ring. This mechanical design is the simplest for allowing the blades to be in a pivot connection relationship with the fixed ring and for the mobile pins of the blades to be able to move along the guidance guideway. Further, this design allows the blades to be partially protected by the rings RM and RF.

Figure 7A:
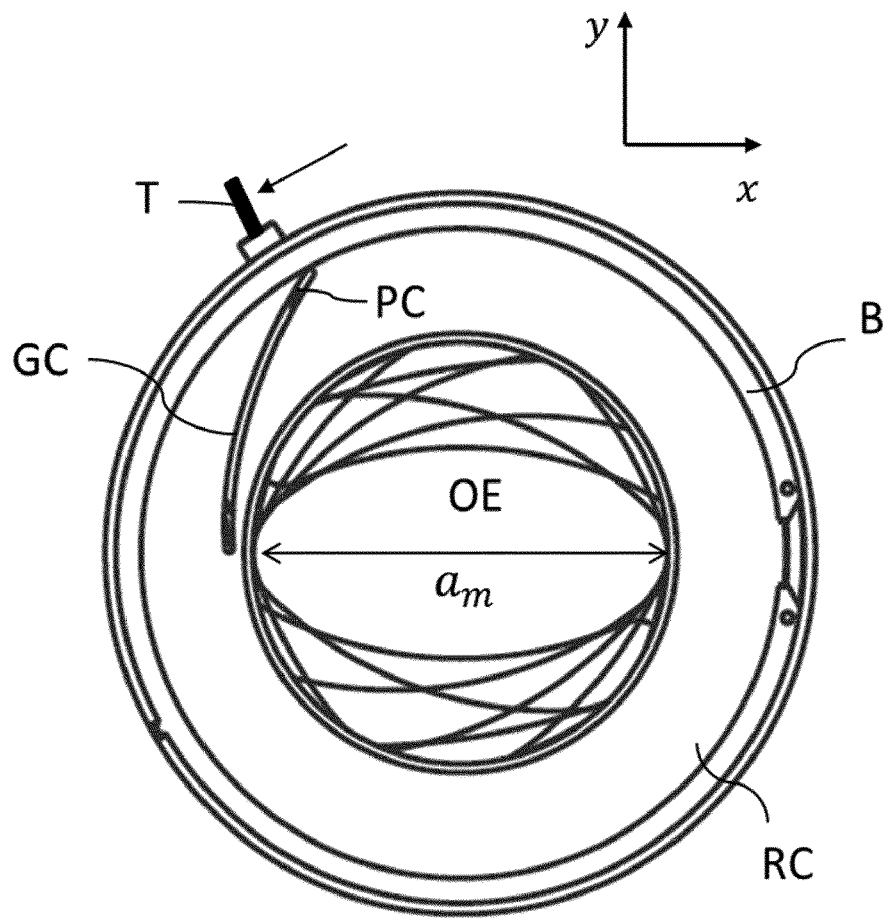
FIG. 7A, FIG. 7B are face-on views of the diaphragm of the embodiment M1 for two diaphragm aperture sizes.
Figure 7B:
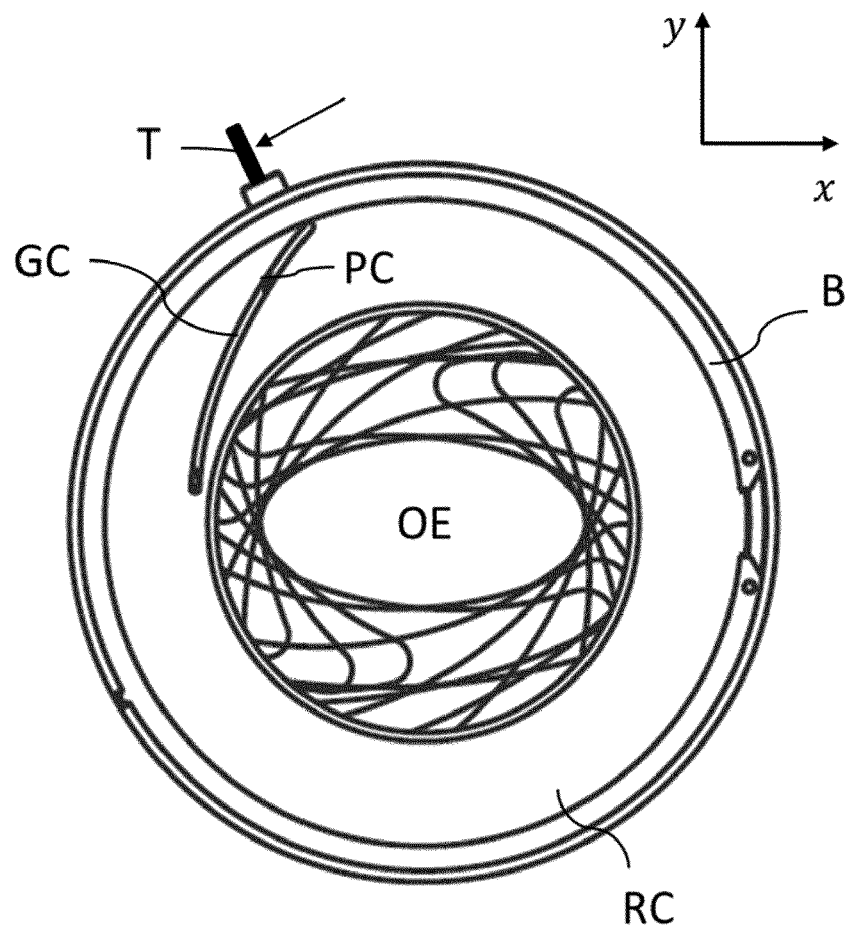
Figure 7C:
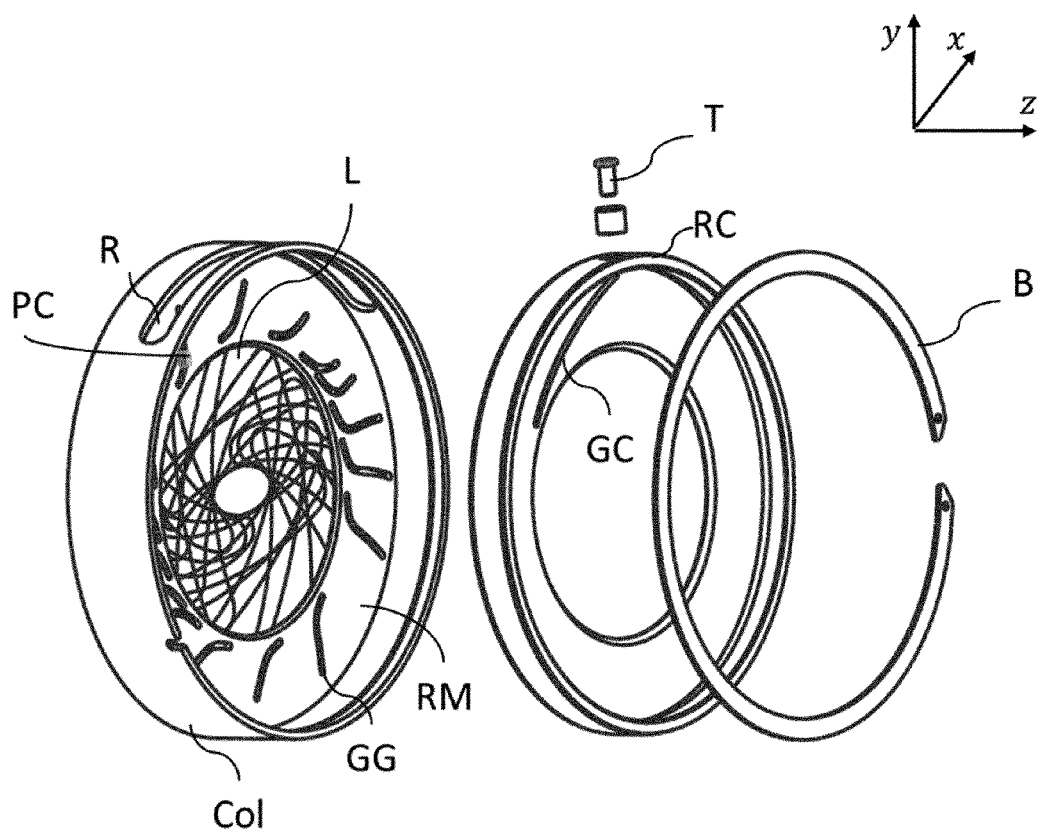
FIG. 7C is an exploded view of the diaphragm of the embodiment M1.

FIGS. 7A and 7B illustrate a face-on view of the diaphragm of the embodiment M1 for two diaphragm aperture sizes (a larger aperture size in the case of FIG. 7A and a smaller aperture size in the case of 7B). The diaphragm of the embodiment M1 comprises a stack formed of the fixed ring RF, the blades L, the mobile ring RM of the embodiment M1, the control ring and a retaining ring B designed to hold the stack in place under the collar Col. FIG. 7C depicts a perspective and partially exploded view of the elements of the diaphragm of the embodiment M1.

In order for the shape of the aperture formed by the diaphragm to remain elliptical from the largest to the smallest diaphragm aperture size, it is necessary for the aperture OE formed by the blades not to be truncated by any one of the rings RC, RM and RF. What this means to say is that it is necessary for the rings RC, RF and RM to have a central aperture that is such that at least a central aperture of one of the rings defines a maximum dimension $a_m$ of the major axis a of the elliptical aperture. In this embodiment M1, the slot R limits the travel of the peg T so that the rotation of the control ring RC about the optical axis occurs in a predetermined angular sector and such that $a_m$ is equal to the diameter of the aperture of the rings RC, RF and RM. This maximum dimension is illustrated in FIG. 7A which corresponds to the maximum diaphragm aperture configuration, namely the configuration when the major axis $a=a_m$.

The stack of the various elements within the diaphragm of the embodiment M1 illustrated in FIGS. 7A-7C is such that the mobile ring is arranged between the control ring and the fixed ring. This arrangement is preferred because this is the simplest design that allows the control ring and the mobile ring to move without being impeded by the pivot connections connecting the blades and the fixed ring. Alternatively, according to another embodiment, the stack of elements within the diaphragm is different than that illustrated in FIGS. 7A-7C. However, this other embodiment is not preferred because it adds a great deal more complexity to the design of the various elements.

The invention claimed is:

1. An iris diaphragm having an optical axis (O), comprising:
   a fixed ring (RF),
   a mobile ring (RM) designed to rotate about the optical axis with respect to the fixed ring and comprising a plurality n of guidance guideways (GG),
   a plurality of n blades (L) defining an elliptical diaphragm aperture (OE) having a major axis (a) and a minor axis (b), each blade being able to pivot with respect to the fixed ring about a respective axis and comprising a respective mobile pin (PM) able to move in one of the respective guidance guideways (GG) by bearing along the respective guidance guideway,
   a control ring (RC) designed to rotate about the optical axis with respect to the fixed ring and comprising a control guideway (GC) in which one of the mobile pins, referred to as control pin (PC), is able to move by bearing along the control guideway, a shape of each guidance guideway (GG) on which the respective mobile pin (PM) bears being designed so that a rotation of said control ring (RC) about the optical axis gives rise, via the control pin (PC), to a rotation of said mobile ring (RM) and a movement of the mobile pins (PM) in the guidance guideways (GG) so as to modify an area of the elliptical aperture (OE) without modifying an orientation of the major axis and of the minor axis and without modifying a ratio of the major axis to the minor axis.

2. The diaphragm as claimed in claim 1, wherein the fixed ring and the control ring are configured to allow the mobile ring to rotate about the optical axis in a predetermined angular sector.

3. The diaphragm as claimed in claim 1, wherein the plurality of blades is arranged between the fixed ring and the mobile ring.

4. The diaphragm as claimed in claim 3, wherein the mobile ring is arranged between the control ring and the fixed ring.

5. The diaphragm as claimed in claim 1, wherein the blades have different shapes.

6. The diaphragm as claimed in claim 1, wherein the rings are configured to define a maximum dimension of the major axis of said elliptical aperture.

\* \* \* \* \*